May 2, 1939.  F. C. DAVIS  2,156,840
APPARATUS FOR WASHING ROOT VEGETABLES
Filed Nov. 27, 1937   2 Sheets-Sheet 1
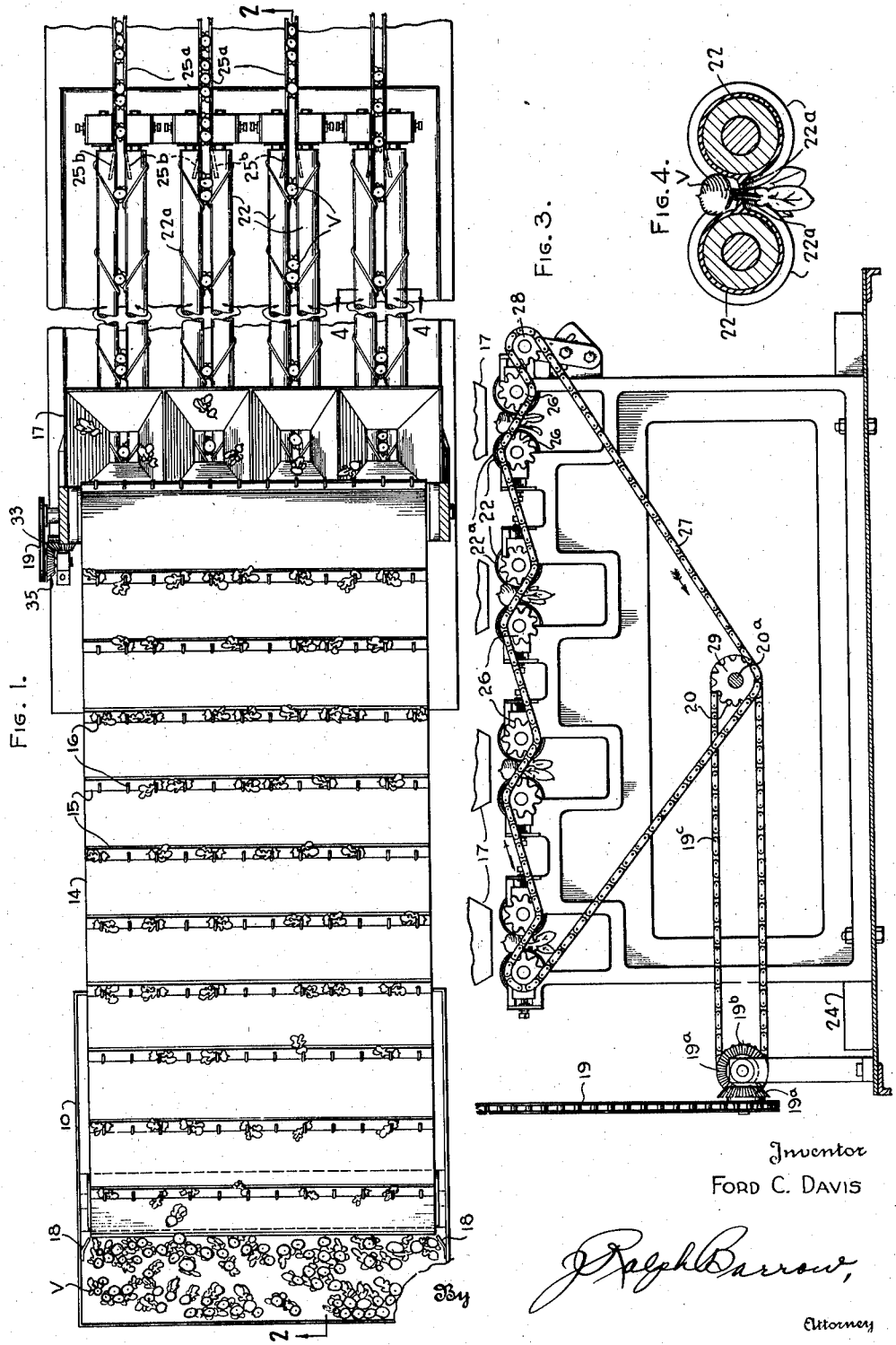
Inventor
Ford C. Davis

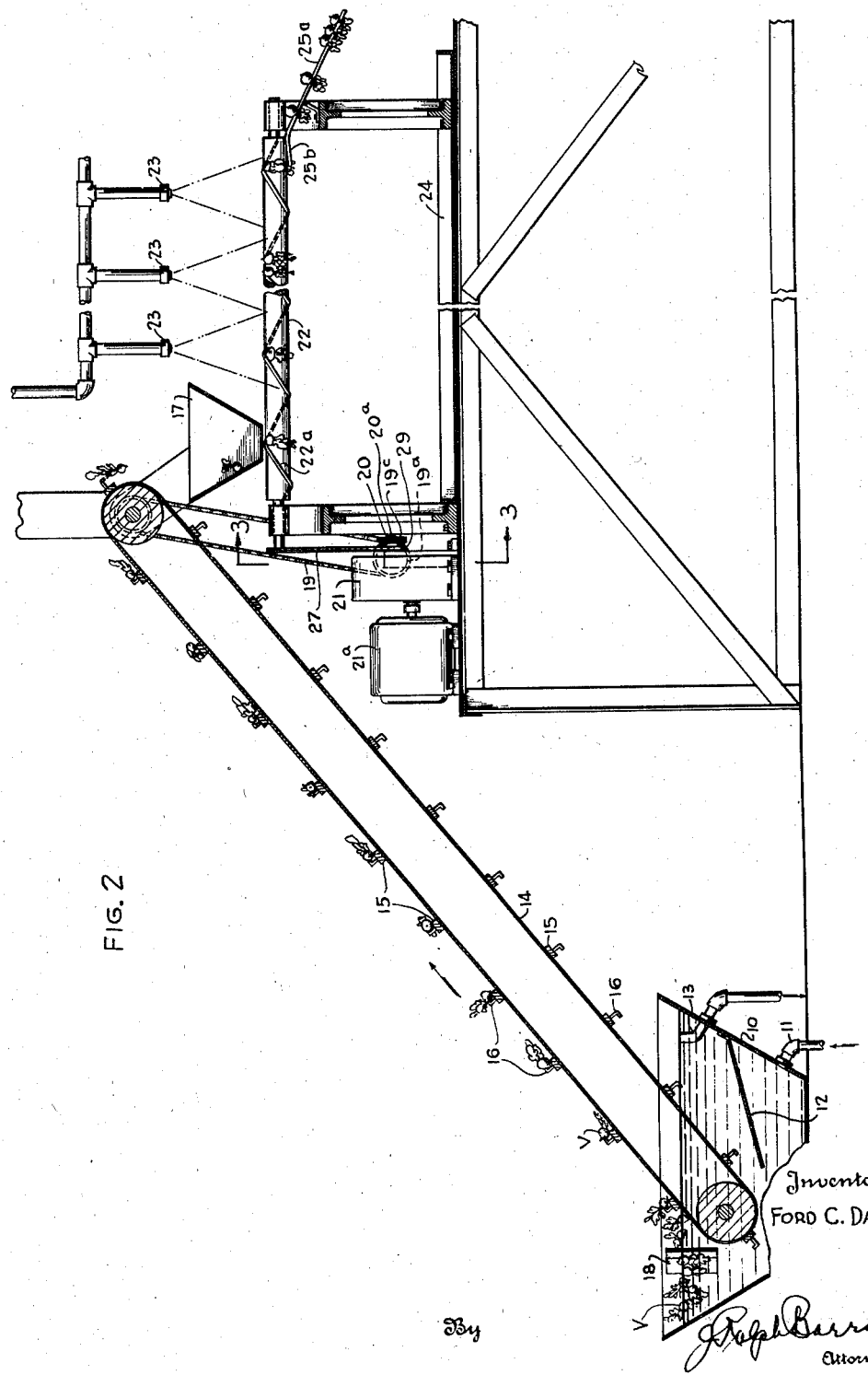

Patented May 2, 1939

2,156,840

UNITED STATES PATENT OFFICE 2,156,840

APPARATUS FOR WASHING ROOT VEGETABLES

Ford C. Davis, Hartville, Ohio

Application November 27, 1937, Serial No. 176,834

4 Claims. (Cl. 146—194)

This invention relates to methods and apparatus for washing root vegetables.

Heretofore, root vegetables have been washed by simply dumping into tanks and agitating in water or by applying sprays of water over a batch of vegetables in heterogeneous arrangement.

Applicant has found that root vegetables, such as radish, turnip, beets, etc., are most effectively washed if inverted with tops down and sprayed, the spray agitating the tops and loosening any dirt or grit in the top, especially that around the stems adjacent the root whereby it is effectively carried away by the downward flow of water from the vegetables.

One object of the present invention is to provide such a method of washing vegetables.

Another object of the invention is to provide an effective apparatus for carrying out said method.

Another object is to provide a washer in which the vegetables are automatically fed through the washer all in an inverted condition.

A further object of the invention is to provide a vegetable washer in which undersized vegetables are discarded.

A further object is to provide a washer delivering the vegetables all in the same relative position.

The foregoing and other objects of the invention are attained by the method and apparatus illustrated in the accompanying drawings and described below. It is to be understood that the invention is not limited to the specific form thereof shown and described.

Of the accompanying drawings:

Figure 1 is a plan of apparatus embodying and adapted to carry out the invention.

Figure 2 is a section on line 2—2 of Figure 1.

Figure 3 is a section on line 3—3 of Figure 2, and

Figure 4 is a section on line 4—4 of Figure 1.

Referring to the drawings, the numeral 10 designates a tank into which may be supplied water through a supply pipe 11 behind a downwardly directed baffle 12 adjacent the bottom of the rear of tank 10 so that the water will be directed downwardly and forwardly toward the front of the tank off which it will be baffled upwardly and rearwardly and will flow to a drain 13 so arranged as to maintain water in the tank at a definite level while it is being circulated through the tank. Such an arrangement provides for rearwardly feeding vegetables such as radishes indicated at V which have been dropped into the front of tank 10 so that the vegetables will be urged against a conveyor to be described.

An upwardly and rearwardly inclined endless conveyor 14 is arranged with its lower end in tank 10 and may have thereon cross-pieces 15 on which are hooks 16 designed to engage with the vegetables V and convey them up out of tank 10 and to deliver them to hoppers 17. Baffles 18, 18 are provided for guiding the vegetables V in tank 10 onto the conveyor 14. Conveyor 14 may be driven by a drive chain 19 through bevel gears 19$^a$, 19$^a$ and a sprocket 19$^b$, the latter being driven by a chain 19$^c$ connecting with a sprocket 20 on shaft 20$^a$ driven through a reduction gearing 21 by a motor 21$^a$.

Hoppers 17 are arranged to receive vegetables V dropping off the upper end of conveyor 14 and to deposit the same between pairs of rolls 22, 22, at one end of said rolls. The rolls 22 are spaced apart so as to retain the root vegetables of desired size thereon and so as to provide a space therebetween into which the vegetable tops may be urged by rotation of the rolls inwardly toward the bight thereof at the top of the rolls whereby the vegetables will automatically be inverted or held in inverted positions by the rotating rolls (see Figure 4). The surfaces of the rolls 22 preferably are of rubber or equivalent material which will be lubricated by water spraying thereon and will not bruise the vegetables. The rolls 22 are also designed to feed the vegetables along the rolls through a spray, as by forming projecting helical webs 22$^a$ on the rolls, so extended as to cooperate with the vegetables and move them longitudinally along the rolls through and out of the washer. Arranged in association with rolls 22, preferably above the same are one or more, preferably a series of water spray nozzles 23, 23. A pan 24 may be arranged below the rolls 22 to receive the water draining from the vegetables and rolls 22, which pan may be connected with a suitable drain (not shown).

At the end of the rolls 22 remote from hoppers 17 there are provided a series of vegetable take-off conveyors 25$^a$, 25$^a$ which may extend to a vegetable bunching unit (not shown). These take-off conveyors may comprise spaced rails 25$^a$, 25$^a$ having converging guiding portions 25$^b$, 25$^b$ associated with rolls 22 whereby the roots of the vegetables will be received upon and will slide on rails 25$^a$ with their tops down between the rails. Hence, the vegetables will all pass in the same inverted positions to the buncher.

As will be observed best in Figures 2 and 3, rolls 22 may be driven by sprockets 26, 26, over and under alternate sprockets of which is trained a chain 27 which is trained over a tension-adjusting idler sprocket 28 and under a drive sprocket 29 which is secured on a shaft 20a, driven by motor 21a through reduction 21.

In use, the conveyor 14 and rolls 22 will be continuously driven, water will be continuously circulated through tank 10 and water will be continuously sprayed on rolls 22 from nozzles 23. The vegetables will be dumped into tank 10 in which they will receive a preliminary washing and will be fed by the flow of water against conveyor 14 which will pick up the vegetables and convey them to hoppers 17 into which they will drop and be deposited on rolls 22.

The inward rotation of rolls 22 at the top thereof causes the tops of the vegetables to become engaged in their bights and to be fed downwardly between the rolls, the rolls being set apart such a distance that roots of a minimum size will be retained on the rolls, the culls dropping through. The webs 22a on the rolls feed the vegetables along under spray from nozzles 23 to the ends of the rolls remote from hoppers 17 where the vegetables pass onto rails 25a and will slide from the washer and if desired into a buncher (not shown). As the vegetables slide along rolls 22 they are thoroughly washed, the spray thoroughly loosening and washing away any dirt clinging to the vegetables. The machine delivers the vegetables all in the same relative position.

It will be apparent from the foregoing that, by the invention, a simple, economical washing method and a simple, economical washing machine have been provided whereby root vegetables may be thoroughly washed and by which the vegetables may, in addition, be delivered in the same relative position for efficient bunching operations.

Modifications of the invention may be resorted to without departing from the spirit thereof or the scope of the appended claims.

What is claimed is:

1. Apparatus for washing vegetables, comprising a pair of spaced rolls, means for rotating the same inwardly of the upper bight thereof, the surfaces of said rolls being substantially equally spaced at both ends thereof, means for supplying a quantity of root vegetables into said upper bight at one end of the rolls, means for feeding the vegetables from said end of the rolls toward the other end thereof, said rolls causing said vegetables to assume inverted positions by engaging and moving the tops thereof down between the rolls without substantially crushing or tearing the tops, said rolls being spaced so as to retain roots of a desired size thereon, and means for spraying the vegetables on said rolls from above the rolls.

2. Apparatus as set forth in claim 1, said rolls having surfaces of water-lubricated material.

3. Apparatus for washing vegetables, comprising a pair of spaced elements having smooth surfaces throughout their lengths, means for moving the surfaces of said elements inwardly and downwardly in the bight between them, the adjacent surfaces of said elements being substantially equally spaced at both ends thereof, means for supplying a quantity of root vegetables into said bight at one end of said elements, means for feeding the vegetables from said end of the elements toward the other end thereof, said elements causing said vegetables to assume inverted positions by engaging and moving the tops thereof down between the elements without substantially crushing or tearing the tops, said elements being spaced to retain roots of desired size thereon, and means for spraying the vegetables on said elements from above the elements.

4. Apparatus for washing vegetables, comprising a pair of spaced elements having smooth surfaces throughout their lengths, means for moving the surface of at least one of said elements inwardly and downwardly toward the bight between the elements, the surfaces of said elements adjacent said bight being substantially equally spaced at both ends thereof, means for supplying a quantity of root vegetables into said bight at one end of said elements, means for feeding the vegetables from said end of the elements toward the other end thereof, said elements causing said vegetables to assume inverted positions by engaging and moving the tops thereof down between the elements without substantially crushing or tearing the tops, said elements being spaced to retain roots of desired size thereon, and means for spraying the vegetables inverted by said elements.

FORD C. DAVIS.